United States Patent [19]

Hagihara

[11] 4,379,056

[45] * Apr. 5, 1983

[54] FILTERING SCRAPER CLEANING DEVICES

[76] Inventor: Tadashi Hagihara, 4-1, 5-chome, Minami Nagasaki, Toshima-ku, Tokyo, Japan

[ * ] Notice: The portion of the term of this patent subsequent to Sep. 2, 1997, has been disclaimed.

[21] Appl. No.: 232,013

[22] Filed: Feb. 6, 1981

Related U.S. Application Data

[63] Continuation of Ser. No. 79,354, Sep. 27, 1979, abandoned.

[51] Int. Cl.³ .............................................. B01D 23/24
[52] U.S. Cl. .................................... 210/415; 210/498; 209/397; 162/274; 134/6
[58] Field of Search ............... 209/393, 395, 397, 399, 209/274, 281, 283, 379, 384, 389; 210/396, 397, 407, 408, 413–415, 498; 162/274; 134/6

[56] References Cited

U.S. PATENT DOCUMENTS

943,869 9/1909 Gaston .................................. 209/397
4,220,540 9/1980 Hagihara ............................ 210/415

Primary Examiner—Ferris H. Lander
Attorney, Agent, or Firm—Malin & Haley

[57] ABSTRACT

An improved filtering system that includes a cleaning assembly and a filter element in the form of a plate or drum with a plurality of long, narrow through openings or slits in each of a plurality of rows. The improved cleaning assembly and filter element includes slit cleaning elements connected downstream of the hill and dale filter element or an improved slit cleaning element upstream of the flat surface or drum surface of a filter with upstream connecting slits. The cleaning assembly may also include a scraper cleaning element positioned for relative movement in relationship to the filter element. As fluid enters the filtering system, the debris or trash is filtered from the fluid and deposited on the upstream surface of the filter element and in the slits for removal by the cleaning assembly.

2 Claims, 8 Drawing Figures

FILTERING SCRAPER CLEANING DEVICES

This is a continuation of application Ser. No. 079,354, filed Sept. 27, 1979, and now abandoned.

BACKGROUND OF THE DEVICES

Various types of wire filter means have been used in the past. The filter collected material restricts the filter openings and retards or stops the flow of fluid through the filter. Various types of wire filter means have been especially difficult to clean while in operation. The R. E. Cleveland U.S. Pat. No. 2,086,067 shows a screen plate structure used in paper making machines. The Susumu Nagatoshi et al U.S. Pat. No. 4,146,481 shows a prior art cleaning assembly. The only prior device that provides continuous positive acting means for cleaning and debris removal from the slit filter elements in a plate is disclosed in the applicant's pending patent application Ser. No. 14,867. This application provides a new and improved filtering and cleaning system for use in an operational filter apparatus.

SUMMARY OF THE DEVICES

One filter cleaning system includes a filter and a slit cleaning element for cleaning the filter. The filter body is constructed of sheet material with a plurality of hills and dales having a generally broad upstream surface and downstream surface with a plurality of individual, spaced apart, long, narrow through openings in each dale. The openings are in rows with each opening aligned with an opening in each adjacent row. Each of the openings have an entrance on the upstream surface and an exit on the downstream surface. The exits are larger than each of the entrances. Each of the exits are aligned with respect to each entrance. Each of the openings, including side walls and end walls sloping away from the opposite wall between said entrance and said exit. The thin slit cleaning element is moved through the openings to move the previously collected debris out of the slit and on to the upstream surface. Interconnection means are included in the filter design to guide or aid the slit cleaning element movement from opening to opening in adjacent rows. The interconnecting means includes the positioning and spacing of adjacent dale portions, and sizing of the slit cleaning element to allow the slit cleaning element to move into a next adjacent exit opening before the slit cleaning element moves out of the prior cleaned opening. The spaced apart dales therefore guide the movement of the slit cleaning elements. A wiper may be connected to move across the upstream surface to move the debris from the upstream surface.

Another filter cleaning system includes a filter and a slit cleaning system. The filter includes a body of sheet material having a generally broad upstream surface and downstream surface with a plurality of individual, spaced apart, long, narrow through openings in a plurality of rows. The openings in each row are aligned with respect to the openings in the adjacent rows. Each of the openings has an entrance on said upstream surface and an exit on the downstream surface. The exits are designed larger than the entrance. Each of the exits are aligned with respect to the entrance. Each of the openings includes an upstream portion and a downstream portion. The downstream portion includes side walls and end walls sloping away from the opposite wall between the upstream portion and the exit. Each of the entrances has interconnection slits in the upstream surface that extends between adjacent entrances. The interconnection slits are used to guide slit cleaning fingers from each entrance opening to the adjacent entrance opening in the adjacent row. The upstream portion of each opening is an entrance slit having the same width as the interconnection slits. The connected entrance slits and interconnecting slits provide a continuous channel. The interconnecting slit depth is at least equal to, but preferably greater than the depth of a slit cleaning finger that is moved along in the interconnecting slits and entrance slits. The upstream portion of the opening has a depth less than the depth of the penetrating portion of the slit cleaning element. Therefore, the bottom or distal end of the slit cleaning element projects through the upstream portion and into the downstream portion of the opening.

It is an object of this invention to provide a slit cleaning system utilizing slit elements that move through the opening in the filter from an upstream position.

Another object of this invention is to provide an upstream slit cleaning system with interconnecting slits between rows of openings on the upstream side of the filter.

It is another object of this invention to provide a hill and dale filter with a particular configuration that allows the slit cleaning element to engage in the next adjacent opening before being disengaged from the prior openings.

An additional object of this invention is to provide a slit cleaning and scraper cleaning system used in conjunction with a filter that are moved relative to one another.

In accordance with these and other objects which will be apparent hereinafter, the instant invention will now be described with particular reference to the accompanying drawings.

DESCRIPTION OF THE PREFERRED EMBODIMENTS

Figure 1:
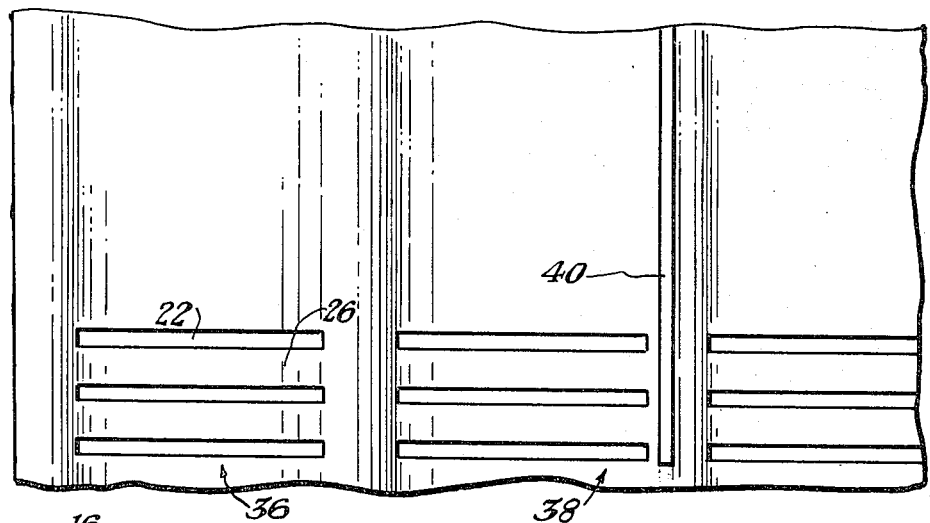
FIG. 1 is a cross-sectional front view of a hill and dale filter shown in FIG. 2.
Figure 2:
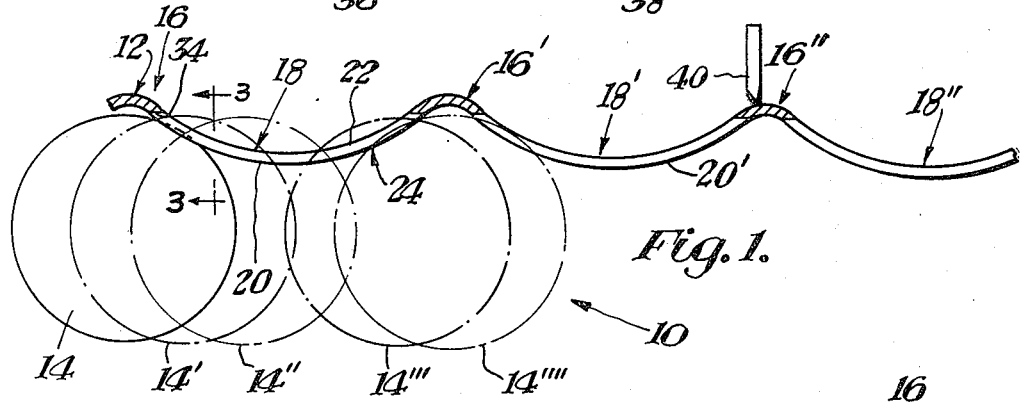
FIG. 2 is a top view of a hill and dale filter.
Figure 3:
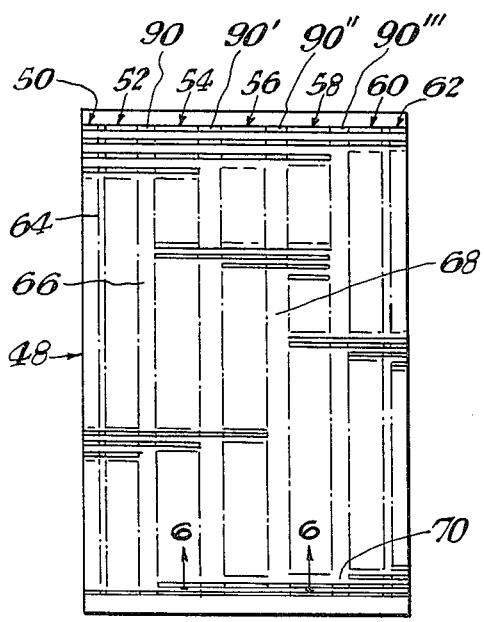
FIG. 3 is an enlarged partial view in cross-section of a portion of FIG. 1 taken along lines 3—3 and looking in the direction of the arrows.

Referring now to FIGS. 1, 2, and 3, the filter cleaning system 10 includes a filter 12 and a slit cleaning element 14 in the shape of a wheel. The filter body 12 is constructed of sheet material with a plurality of hills 16, 16', and 16" and dales 18, 18', and 18". The filter body 12 has a generally broad upstream surface and broad downstream surface with a plurality of individual, spaced apart, long, narrow through openings illustrated as 20 and 20'. Rows of openings are in each dale, as shown in FIG. 2. Each of the openings in the row is aligned with an opening in the adjacent rows.

Each opening has an entrance 22, shown in FIGS. 1 and 2, on the upstream surface 26 and an exit 24 on the downstream surface 28. The exits 24 are larger than each of the entrances 22. Each of the exits 24 are aligned with respect to each entrance 22. Each of the openings, including side walls 30 and 32, shown in FIG. 3, and end walls, one of which is shown at 34, shown in FIG. 1, slope away from the opposite wall between the entrance and the exit. The thin slit cleaning element 14 is moved through the openings 20 and 20' from the downstream side as shown in FIG. 1 at 14 and the phantom illustrations shown at 14', 14'', 14''', and 14''''.

Interconnection means are included in the filter cleaning system. The slit cleaning element is sized in respect to the size and positioning of adjacent dale portions. The sizing provides interconnecting means that allows the slit filter element 14 to extend between adjacent exit openings when moving between openings in rows 36 and 38. This allows the slit filter element to move as illustrated in FIG. 1. The element engages the next adjacent opening before leaving the prior opening of the filter opening being cleaned.

A wiper or scraper 40 may be moved to the left over the upper surface to remove debris from the upper surface of the filter, as shown in FIG. 1. This scraper may be mechanically connected to the slit cleaning element.

Figure 4:
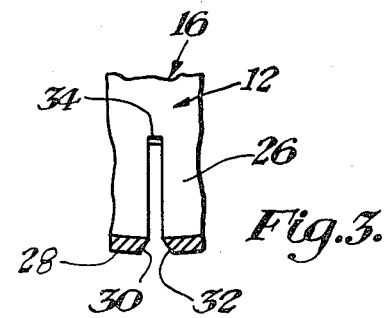
FIG. 4 is a side view of a drum embodiment of a plate filter element.
Figure 5:
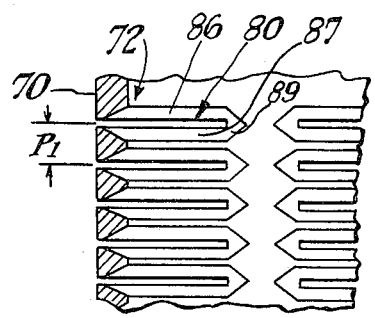
FIG. 5 is an internal view of the filter shown in FIG. 4 partially in cross-section.
Figure 6:
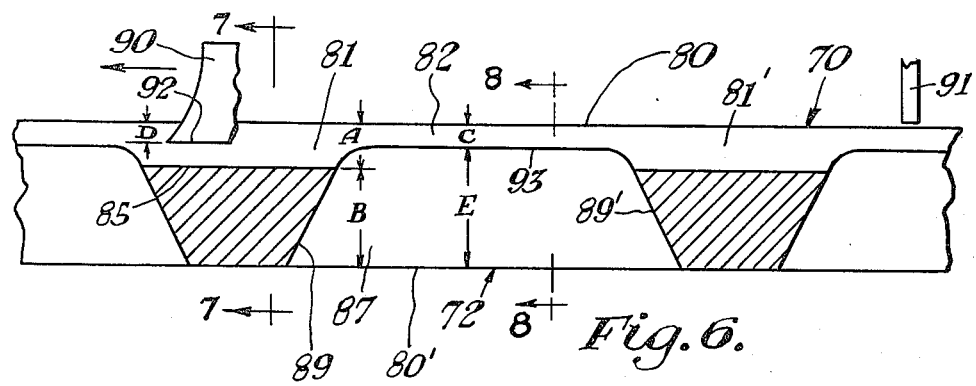
FIG. 6 is an enlarged partial cross-sectional view of FIG. 4 taken along lines 6—6 in the filter openings and looking in the direction of the arrows with a slit-cleaning element illustrated.

Referring now to FIGS. 4, 5, 6, 7, and 8, the filter cleaning system includes a filter and slit cleaning apparatus. Illustrated in FIG. 4 is a filter body 48 in the shape of a drum. FIGS. 5 and 6 show body 48 constructed of sheet material having a generally broad upstream surface 66, 68, and 70 best illustrated in FIG. 4 and downstream surface 72 illustrated in FIGS. 5 and 6 with a plurality of individual, spaced apart, long, narrow through openings such as 50, 52, 54, 56, 58, 60, and 62, see FIG. 4. As shown in FIG. 5, each of the openings have an entrance 80 on the upstream surface 70 and an exit 80' on said downstream surface 72. The exits being larger than each entrance. Each of the exits are aligned with respect to each entrance 80. Each entrance of openings 52, 54, 56, 58, 60 and 62 is connected to an adjacent opening by a slit 90, 90', 90'', and 90''' respectively, see FIG. 4.

Each of the openings includes an upstream portion designated C in FIG. 6 and a downstream portion designated E in FIG. 6. The downstream portion, includes side walls 86 and 87 and end walls 89 and 89' shown in FIGS. 6 and 8. Each of the walls slope away from the opposite wall between the bottom of the upstream portion C and the exit 80' and each of the entrances have interconnection means 81 or 81' in the upstream surface 70 having a depth designated as A. The interconnecting means extends between adjacent entrances of the opening to guide the slit cleaning element or finger 90 between each opening.

Figure 7:
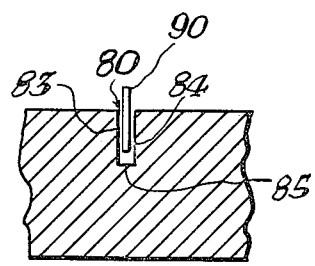
FIG. 7 is an enlarged partial cross-sectional view of the filter element shown in FIG. 6 taken along lines 7—7 and looking in the direction of the arrows.
Figure 8:
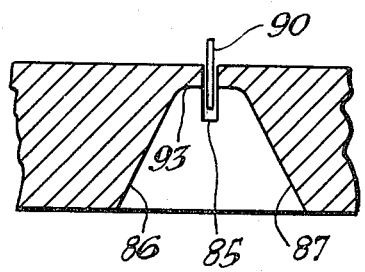
FIG. 8 is an enlarged partial cross-sectional view of the filter element shown in FIG. 6 taken along lines 8—8 and looking in the direction of the arrows.

In one example of the filter and slit cleaning finger or element 90, but not limited to, shown in FIGS. 6, 7, and 8, is having a plate with portions A and B equal to 2.5 millimeters. With portion A being equal to 1 millimeter and portion B equal to 1.5 millimeters. Portion C may be 0.2 millimeters and the blade depth, illustrated as portion D, will be 0.5 millimeters. This shows that the blade 90 will move through slit 81 above the bottom of the slit, designated by numeral 91. As the element continues in the direction of the arrow, it will move into the opening entrance 80 and will position its bottom distal end 92 below the straight slit opening portion C but above of depth A. This is best illustrated in FIG. 8, the distal end 92 of the blade 90 will be positioned below surface 93 and above surface 85. The element 90 is illustrated much thinner than preferred for clarity. This sizing of the entrance and exit and the interconnecting slit provides a workable upstream slit cleaning system.

The upstream slit cleaning system shown in FIGS. 6 through 8 may be used in filter bodies of various configurations. The filter body may be circular with the upstream surface of FIG. 6 being the outer surface and the downstream surface of FIG. 6 being the inner surface. The cleaning elements and blades may be placed in a fixed position and the filter body may be moved or vice versa. The relative movement between the wiper blade and slit cleaning element will clean the upstream or outer surface of the filter.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A filter cleaning system, comprising:
   a positioning means including a downstream slit cleaning means and a filter body,
   said slit cleaning means for movement in a line having a constant course straight or arcuate in one plane for removing debris from through openings in said filter cleaning system, said slit cleaning means including moving slit cleaning elements moving in a line having a constant course straight or arcuate in one plane,
   said filter body of sheet material with a plurality of hills and dales having a generally broad upstream surface and a broad downstream surface with a row of said through openings in each dale bordered by a non channeled body portion, each row includes a plurality of individual, spaced apart, long, narrow through openings,
   each opening of said through openings being aligned with an opening in adjacent rows without an interconnecting channel,
   each said opening having an entrance at said upstream surface and an exit at said downstream surface with each said exit being larger than each said entrance,
   each said exit aligned with respect to said entrance,
   each side opening shaped without offset and including side walls and end walls continuously sloping without offset away from the opposite wall between said entrance and said exit, and
   positioning means for guiding a slit cleaning element between aligned openings in adjacent dales, and for positioning said slit cleaning means and each said opening aligned with an opening in adjacent row of said filter body for linear movement of said slit cleaning elements in said openings from dale to dale in each row,
   drive means connected to said filter cleaning system to move said slit cleaning means along a linear path relative to said filter body to remove debris from the opening in said filter body.

2. A filter cleaning system, comprising:

a filter body of sheet material having a generally broad upstream surface and downstream surface with a pluraliey of individual, spaced apart, long, narrow through openings boardered by a channelled in the upstream surface and a non channelled downstream surface, said openings positioned in a plurality of adjacent rows, each opening aligned with an opening in adjacent rows, each said opening having an entrance on said upstream surface and an exit on said downstream surface with said exits being larger than each said entrance, each said exit aligned with respect to said entrance, each said opening including an upstream portion and a downstream portion, said downstream portion including side walls and end walls which slope without offset away from the opposite wall between said upstream portion and said exit, and each said entrance having an interconnection channel in said upstream surface, said interconnecting channel extending between adjacent entrances, said interconnection channel for guiding slit cleaning elements between openings in adjacent rows, said interconnection channel having a depth greater than said upstream portion, a slit cleaning system including slit cleaning elements, said slit cleaning elements positioned upstream of said filter body and having a depth greater than the depth of said upstream portion, a drive means connected to said filter cleaning system to move said slit cleaning elements relative to said filter body, said interconnecting channel is a slit having a depth greater than said upstream portion and greater than the penetration depth of said slit cleaning elements, said slit cleaning elements positioned to place the distal end in said opening at a depth greater than said upstream portion.

* * * * *